United States Patent
Vivanco

(10) Patent No.: US 11,297,556 B2
(45) Date of Patent: *Apr. 5, 2022

(54) HYBRID LONG TERM EVOLUTION/CELLULAR INTERNET OF THINGS LOCATION BASED SERVICE

(71) Applicant: AT&T Technical Services Company, Inc., Vienna, VA (US)

(72) Inventor: Daniel Vivanco, Sterling, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,709

(22) Filed: Oct. 1, 2020

(65) Prior Publication Data
US 2021/0022062 A1    Jan. 21, 2021

Related U.S. Application Data

(63) Continuation of application No. 16/202,792, filed on Nov. 28, 2018, now Pat. No. 10,834,654.

(51) Int. Cl.
*H04W 36/32* (2009.01)
*H04W 4/02* (2018.01)
(Continued)

(52) U.S. Cl.
CPC ............. *H04W 36/32* (2013.01); *H04W 4/02* (2013.01); *H04W 4/12* (2013.01); *H04W 4/33* (2018.02); *H04W 24/10* (2013.01); *H04W 36/0085* (2018.08); *H04W 36/0088* (2013.01); *H04W 36/0094* (2013.01); *H04W 36/00835* (2018.08);
(Continued)

(58) Field of Classification Search
CPC ......... H04W 36/32; H04W 4/02; H04W 4/12; H04W 4/33; H04W 24/10; H04W 36/00835; H04W 36/0085; H04W 36/0088; H04W 36/0094; H04W 48/14; H04W 64/003; H04W 88/02; H04W 4/90;
(Continued)

(56) References Cited

U.S. PATENT DOCUMENTS 9,733,337 B2    8/2017    Edge et al.
9,949,263 B2    4/2018    Li et al.
(Continued)

OTHER PUBLICATIONS

Non-Final Office Action received for U.S. Appl. No. 16/202,792 dated Mar. 27, 2020, 63 pages.
(Continued)

*Primary Examiner* — Ricardo H Castaneyra
(74) *Attorney, Agent, or Firm* — Amin, Turocy & Watson, LLP

(57) ABSTRACT

An enhanced location based service for hybrid long term evolution (LTE) and/or Cellular Internet of Things (CIoT) network is disclosed. A method can comprise receiving, from a user equipment device, via a radio access technology, a first message representative of a request for measurement gap information for a location based service; determining a location of the user equipment device based on a serving cell location of a serving cell device that services the user equipment device; and transmitting, to the user equipment device, a second message comprising data representative of the measurement gap information.

20 Claims, 14 Drawing Sheets

(51) Int. Cl.
  *H04W 24/10* (2009.01)
  *H04W 4/33* (2018.01)
  *H04W 4/12* (2009.01)
  *H04W 88/02* (2009.01)
  *H04W 48/14* (2009.01)
  *H04W 64/00* (2009.01)
  *H04W 36/00* (2009.01)
  *H04W 4/90* (2018.01)

(52) U.S. Cl.
  CPC ......... *H04W 48/14* (2013.01); *H04W 64/003* (2013.01); *H04W 88/02* (2013.01); *H04W 4/90* (2018.02)

(58) Field of Classification Search
  CPC ......... H04W 4/21; H04W 4/70; H04W 64/00; H04W 76/28
  See application file for complete search history.

(56) References Cited

U.S. PATENT DOCUMENTS

| | | |
|---|---|---|
| 10,021,624 B2 | 7/2018 | Tiwari |
| 2013/0337847 A1* | 12/2013 | Sridhara ............... G01S 13/876 455/456.6 |
| 2014/0094188 A1* | 4/2014 | Kazmi .................. H04W 4/023 455/456.1 |
| 2017/0318047 A1 | 11/2017 | Hampel et al. |
| 2018/0054796 A1 | 2/2018 | Edge |
| 2018/0092114 A1 | 3/2018 | Ashworth et al. |
| 2018/0109941 A1 | 4/2018 | Jain et al. |
| 2018/0150289 A1 | 5/2018 | Mrangi et al. |
| 2018/0206093 A1 | 7/2018 | Jain et al. |
| 2018/0213468 A1 | 7/2018 | Chatterjee et al. |
| 2019/0052996 A1 | 2/2019 | Sahai et al. |

OTHER PUBLICATIONS

Notice of Allowance received for U.S. Appl. No. 16/202,792 dated Jul. 9, 2020, 62 pages.

Muhammad, et al. "Technologies and Solutions for Location-Based Services in Smart Cities: Past, Present, and Future," IEEE Access 6 (2018): 9 pages.

* cited by examiner

HYBRID LONG TERM EVOLUTION/CELLULAR INTERNET OF THINGS LOCATION BASED SERVICE

RELATED APPLICATION

The subject patent application is a continuation of, and claims priority to, U.S. patent application Ser. No. 16/202,792 (now U.S. Pat. No. 10,834,654), filed Nov. 28, 2018, and entitled "HYBRID LONG TERM EVOLUTION/CELLULAR INTERNET OF THINGS LOCATION BASED SERVICE," the entirety of which application is hereby incorporated by reference herein.

TECHNICAL FIELD

The disclosed subject matter provides an enhanced location based service for hybrid long term evolution (LTE) and/or Cellular Internet of Things (CIoT) network using, for example, advanced forward link trilateration (AFLT) to triangulate a position of a user equipment device.

BACKGROUND

Indoor location based services have become crucial for public safety and first responder (FirstNet) emergency situations. At the moment, location based services have poor ranging when user equipment (UE) devices are located in indoor locations.

DETAILED DESCRIPTION

Figure 1:
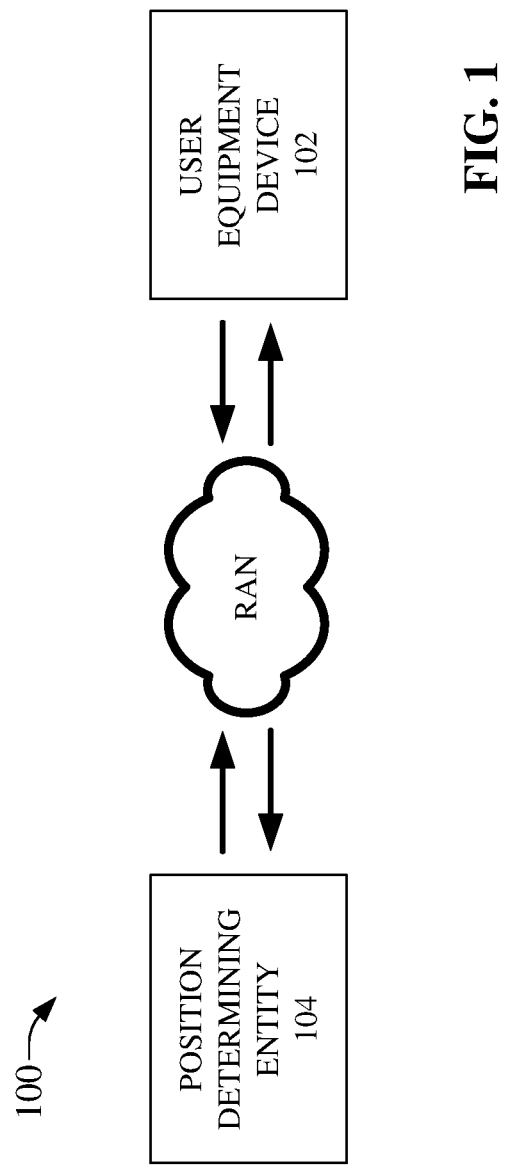
FIG. 1 is an illustration of a system that provides enhanced location based services for hybrid long term evolution (LTE) and/or Cellular Internet of Things (CIoT) networks, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed systems and methods, in accordance with various embodiments, provide a system, apparatus, or device comprising: a processor, and a memory that stores executable instructions that, when executed by the processor, facilitate performance of operations. The operations can comprise receiving, from a user equipment device via a radio access technology, a first message representative of a request for measurement gap information for a location based service; determining a location of the user equipment device based on a serving cell location of a serving cell device that services the user equipment device; and transmitting, to the user equipment device, a second message comprising data representative of the measurement gap information.

Further operations can comprise determining a frequency band available at the location of the user equipment device; and determining the radio access technology available at the location of the user equipment device. Additional operation can comprise based on the location of the user equipment device being determined as being an indoor location, determining a probability that the user equipment device receives a signal transmitted via the radio access technology; and based on a frequency band being available at the location of the user equipment device, determining a pilot signal scanning periodicity that the user equipment device uses to scan for a frequency band available at the location of the user equipment device. The operations can also include based on a radio access technology being available at the location of the user equipment device, determining a pilot signal scanning periodicity that the user equipment device uses to scan for the radio access technology available at the location of the user equipment device; and facilitating the serving cell device to request the user equipment device to perform an inter-band pilot signal scan for a neighbor base station device during a measuring gap interval provided in the measuring gap information. Further operations can comprise facilitating the serving cell device to request the user equipment device to perform an inter-technology pilot signal scan for a neighbor base station device during a measuring gap interval provided in the measuring gap information; and facilitating the user equipment device to return a pilot signal measurement within a defined period of time.

In accordance with further embodiments, the subject disclosure describes a method and/or process, comprising a series of acts that can include: sending, by a system comprising a processor, a request for data representing measurement gap information for a location based service; and in response to receiving the data, performing, by the system, an inter-band pilot signal scan for a neighbor base station device during a defined measurement gap interval, wherein the defined measurement gap interval is included in the data.

Additional acts can comprise in response to receiving the data, performing, by the system, an inter-technology pilot signal scan for the neighbor base station device during the defined measurement gap interval; performing, by the system, an intra-band pilot signal measurement with a defined time periodicity; and performing, by the system, an inter-band pilot signal measurement with a defined time periodicity. An addition act can comprise performing, by the system, an inter-technology pilot signal measurement within a defined time periodicity.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can include: receiving, from a user equipment device, via a radio access technology, a first message representative of a request for measurement gap information for a location based service; determining a location of the user equipment device based on a serving cell location of a serving cell device that services the user equipment device; and transmitting, to the user equipment device, a second message comprising data representative of the measurement gap information.

In accordance with the foregoing, the radio access technology can be an implementation of a narrow band long term evolution (NB-LTE) technical standard; or can be an implementation of a long term evolution machine (LTE-M) standard. Further, the location of user equipment device can be inside a habitable structure. Additionally, the location based service can be operational on a position determination entity device that can be communicatively coupled to the serving cell device.

Long term evolution (LTE) is a widely used solution for cellular communications. LTE user equipment (UE) devices can either use global positioning system (GPS) and/or triangulation techniques for location based services. Both signals, GPS and/or LTE, can on occasion not penetrate indoor locations and thus may not provide accurate location services in these circumstances.

Cellular systems are becoming an important radio access network technology to connecting "things," such as devices like audio/visual devices, automotive devices, and/or home appliances (e.g., televisions, refrigerators, freezers, thermostats, garage door openers, security cameras, automotive entertainment centers, and the like) to the Internet. The foregoing cellular systems and their associated infrastructures, as well as commercially available standardized wireless communications technologies separately and/or in conjunction can, for instance, be reused during times of emergency for purposes of UE device location.

Cellular manufactures, such as producers of televisions, refrigerators, freezers, garage door openers, security cameras, thermostats, automotive entertainment centers, . . . , and mobile network operators (e.g., wireless and/or wired network carriers) are already including internet of things (IoT) related functionalities and facilities into existing cellular standards and devices. LTE radio network functionalities can be optimized to enable simple low cost devices. The LTE radio network functionalities implemented in these simple low cost devices can comprise transmission protocols and/or higher layer protocols that can be optimized for reduced device power consumption. Additionally, the LTE radio network functionalities and facilities can be enhanced to boost coverage so that deep indoor locations and rural areas can be easily accessed. The development of cellular IoT (CIoT) is being phased in with the implementation of 3GPP (3rd Generation Partnership Project) release 12 and 3GPP release 13 technical standards. 3GPP release 12 provides devices that have lower costs and utilize less power and 3GPP release 13 provides devices optimized for greater coverage and are even less expensive than devices that implement 3GPP release 12. Additionally, implementation of the 3GPP release 13 standard can implement narrow band LTE (NB-LTE) and/or LTE machine (LTE-M) standards. NB-LTE devices can typically transmit and/or receive in the approximately 200 kilohertz (kHz) broadcast spectrum, while LTE-M device can generally transmit and/or receive in the approximately 1.4 megahertz (MHz) broadcast spectrum.

Devices that implement NB-LTE and/or LTE-M (e.g., CIoT devices) can have a larger maximum coupling loss (MCL) than traditional LTE. For example traditional LTE devices can experience a MCL of approximately 140 decibels (dB) whereas NB-LTE devices can experience a MCL that approaches approximately 164 dB, and LTE-M devices can experience a MCL that can approach approximately 156 dB. As will be evident to those having skill in the art, MCL can refer to the limit value of the coupling loss at which a service can be delivered. Generally, larger MCLs relate to larger/deeper coverage.

CIoT coverage enhancement can be achieved using a combination of techniques including power boosting of data and/or reference signals, repetition of data and/or reference signals, retransmission of data and/or signals, and/or relaxing performance requirements, for example, by allowing longer acquisition times and/or high error rates.

CIoT devices that have implemented the NB-LTE and/or LTE-M aspects of the 3GPP release 12 and/or 3GPP release 13 technical specifications can be attractive solutions for cellular operators due to a number of factors, such as low-cost especially on the device side. For instance, NB-LTE implementations can require less expensive radiofrequency components. In addition, cost reductions can also be attained on the baseband side based on the lower data rates necessary for communication. Further, other beneficial factors can include coverage improvements due to the ability to concentrate transmission power in a narrow bandwidth; efficient spectrum utilization a smaller bandwidth is needed.

In regard to efficient spectrum utilization, for example, LTE-M can be deployed by reforming only one Global System for Mobile (GSM) communication channel, or the communication channel can be deployed on a guard band of an existing LTE deployment. Further, CIoT devices can take advantage of existing technology as well as the installed system base. By making NB-LTE and/or LTE-M compatible with LTE, it is possible to reuse the same hardware and share spectrum without coexistence issues.

By making CIoT devices that have implemented the NB-LTE and/or LTE-M aspects of the 3GPP release 12 and/or 3GPP release 13 compatible with LTE, it is possible to reuse the same hardware and also to share spectrum without coexistence issues. In addition, CIoT devices can simply plug into the LTE core network. This allows all network services such as authentication, security, policy, tracking, and charging to be fully supported.

Location based services (LBS) can refer to an information service, accessible by a user equipment device through a mobile network with the ability of mapping a geographical position of the user equipment device at any given time. One process used by mobile network operators to provide location based services is known as advanced forward link trilateration (AFLT). When AFLT is used a user equipment device takes measurements of the signals of nearby base station devices and reports time and/or distance readings back to a position determination entity (PDE) device. The reported time and/or distance reading received by the PDE device can then be user to triangulate an approximate location of the user equipment device. Typically, at least three surrounding base station devices can be required to obtain an optimal position fix on the user equipment device. AFLT requires precise timing, system-wide base station synchronization, and reserved channel resources to transmit location data.

Generally, PDE devices use the data received from user equipment devices together with map data and/or the latitude and/or longitude coordinates associated with the base station devices to determine a user equipment device location. In this scenario, base station devices periodically broadcast cell information (data) in their pilot signals. These pilot signals can be broadcast in an asynchronous mode to avoid weak signals emanating from base station devices situated at vast remote distances or proximate but remote distances relative to the user equipment device at issue, and to ensure that the pilot signals are not swamped by signals originating from nearby proximate base station devices.

Typically, user equipment devices can continuously and/or periodically (e.g., at defined time intervals, at defined time periods, when a defined time threshold has been exceeded, when a defined time threshold has reached zero, at randomly selected periods of time, . . . ) scan and identify substantially all the pilot signals that they can perceive from neighboring base station devices, including the base station device that is currently servicing the user equipment device. Information collected and identified by user equipment devices in regard to pilot signals can then be transmitted to the PDE devices. The transmission of the information the collected and identified pilot signals can be sent to the PDE device periodically (e.g., at defined or definable time periods).

Existing geo-location (e.g., GPS and/or trilateration) processes for traditional LTE systems, for various reasons, are not accurate for indoor scenarios as ranging measurements are not always available in indoor locations. Nevertheless, indoor location based services can be crucial for public safety and first responder response in cases of emergency.

The subject application provides a hybrid LTE and/or CIoT approach the improves and/or enhances location based services (LBS) in indoor locations. The devices, systems, and/or processes disclosed herein provides LBS for hybrid LTE and/or CIoT networks when AFLT is used to triangulate a user equipment device position. The described devices, systems, and/or processes overcome the current state where poor ranging is the current norm when user equipment devices are positioned within indoor locations.

The subject application, without limitation or loss of generality, assumes that LTE and/or CIoT (NB-LTE and/or LTE-M) technologies have been implemented and can coexist in user equipment devices and/or in the wider mobile network operator network. The advantages and/or enhancements provided by hybrid LTE and/or CIoT triangulation relies on frequency and/or technology diversity. Generally, hybrid LTE and/or CIoT triangulation can require tight dependencies between these waveforms (e.g., LTE and CIoT (NB-LTE and/or LTE-M). The tight dependencies can be achieved by adjusting, based on the quality of base station ranging, the periodicity of inter-frequency and/or inter-technology scanning, and/or the urgency of user equipment device positioning information (e.g., in cases of emergency the periodicity of inter-frequency and/or inter-technology scanning can be commensurately and significantly increased). Typically and in accordance with various described embodiments, user equipment devices can send measurement data corresponding, for example, to base station identification (e.g., eNodeB device identifier data), frequency band data representing a frequency band being used, and/or technology data representing a radio frequency technology being used (e.g., NB-LTE, LTE-M, LTE 4G, LTE 5G, etc.). Additionally, for purposes of exposition, the sampling rate and/or the rate of dispatching scanned signals sent from user equipment devices to the PDE device can be adjusted as a function of the number of pilots signals that have been detected and/or received by a user device within a defined time period, The PDE device can then use the sampling rate and/or the rate of dispatch of scanned signals sent from user equipment devices to the PDE device to triangulate a user equipment device position.

In accordance with one or more embodiments, a first process can be operational on a user equipment device and a second process can be operational on a PDE device. Generally, the first process operational on the user equipment device can be a counterpart of the second process operational on the PDE device and the first process can initiate a communication session with the PDE device. Initiation of the communication session between the first process and the second process can correspond to the user equipment device requesting provision of location based services from the PDE device on which the second process can be operational.

Should the user equipment device be located indoors, then, as will be appreciated by those of ordinarily skill in the art, the LTE signal will typically will be weak or greatly attenuated and as such insufficient pilot signals can be received to provide an accurate location. For instance, a user equipment device can determine that fewer than a defined threshold number of pilot LTE signals have been received to provide an accurate location. Based on the user equipment device determining that insufficient pilot signals have been received to render an accurate location, the first process operational on the user equipment device can send a message to the second process operational on the PDE device. The message to the second process operational on the PDE device can, for example, be directed through the base station device that is currently acting as a serving cell device for the user equipment device. The message sent by the user equipment device to the PDE device can comprise a request for appropriate measurement gap data for location based services.

In response to receiving a request for appropriate measurement gap data from a user equipment device, the second process operational on the PDE device can determine (e.g., perform an estimation) the location of user equipment device based on a location of the serving cell device through which the user equipment device sent the request for appropriate measurement gap data. The second process operational on the PDE device can thereafter request multi-band network topologies and/or multi-technology network topologies from a core network device, such as in a LTE-EMS device. A LTE-EMS device is an LTE element management system (EMS) device that comprises a collection of similarly configured network devices and application software in execution on the collection of similarly configured network devices. The multi-band network topologies and/or multi-technology network topologies can be utilized to determine frequency bands and multi-technology broadcast technologies (e.g., LTE-M, NB-LTE, LTE 4G, LTE 5G, etc.) available at the user equipment device location (e.g., in the proximate vicinity of the current serving cell device). Additionally, the second process operational on the PDE device can determine a probability that the user equipment device can successfully receive signals broadcast within the determined frequency bands and using one or more of the multi-technology broadcast technologies at the indoor location at which the user equipment device is currently location.

Based on the frequency bands and/or multi-technology broadcast technologies available at location where the user equipment device is situated and the probability that the user equipment device can successfully receive broadcast signals within the determined frequency bands and broadcast using one or more of the multi-technology broadcast technologies at the location where the user equipment device is situated, the second process operational on the PDE device can determine which of the frequency bands and/or which of the multi-technology broadcast technologies can be used by the user equipment device to perform a scan for pilot signals. Further, the second process operational in the PDE device can determine a scanning periodicity that the user equipment device should use to scan for the pilot signals. In regard to determining which of the frequency bands and/or which of the multi-technology broadcast technologies should be used by the user equipment device to perform a scan for pilot signals, scanning for frequency bands and/or multi-technology broadcast technologies that a user equipment device cannot receive at its current location can be a waste of time and user equipment device battery power.

The second process operational on the PDE device can then respond to the message received earlier from the user equipment device requesting measurement gap information for location based services with measurement gap information that can be sent to the serving cell device. The serving cell device then can request the user equipment device to perform inter-band and/or inter-technology pilot signal scanning (e.g. LTE, NB-LTE, LTE-M, etc.) for neighboring base station devices during measurement gap intervals. Pilot signal measurements (e.g., intra-band and/or inter-band and inter-technology) can be sampled at defined or definable periods of time at the user equipment device, and the user equipment device can send these pilot signal measurements to the PDE device.

Now with reference to the Figures, FIG. 1 illustrates a system 100 that provides enhanced location based services for hybrid long term evolution (LTE) and/or Cellular Internet of Things (CIoT) networks. System 100 can include user equipment device 102 that can be in communication, via a radio access network (RAN), with a position determining entity device 104. As will be appreciated by those having ordinary skill in the art, communication between user equipment device 102 and position determining entity device 104 can be facilitated by one or more base station devices (not shown). At least one of the one or more base station devices can be located proximate to user equipment device 102 and can provide the facilities and/or functionalities representative of a serving cell device for user equipment device 102.

In one instance, user equipment device 102 can be located within the interior of a building where the LTE signal is greatly attenuated. In an alternative instance, where, for example, there has been a natural disaster—earthquake/hurricane—user equipment device 102 can be located in the rubble of a collapsed structure where the LTE signal can be weak. In a further instance, user equipment device 102 can be situated in a rural or sparsely populated area where, due to a paucity of telecommunication infrastructure, the LTE signal can be greatly diminished. In such instances, user equipment device 102 can determine whether or not the LTE signal has become attenuated or weakened as a function of the number of LTE pilot signals that the user equipment device 102 receives within a defined or definable time period falls below a defined or definable threshold. The number of LTE pilot signals received within a defined duration of time can typically be used by user equipment device 102 to provide accurate positional information in regard to the location of user equipment device 102. Usually, the number of LTE pilot signals necessary to provide accurate positional data in regard to location should exceed two pilot signals.

In accordance with an aspect therefor, user equipment device 102 can determine whether or not, within a definable time period (e.g., n milliseconds), the number of LTE pilot signals that have been received fails to exceed a definable threshold value (e.g., m pilot signals). User equipment device 102, in response to determining that fewer LTE pilot signals than the definable threshold value have been received within the defined time period can initiate communication to the radio access network (RAN) using an available alternate radio access technology, such as NB-LTE and/or LTE-M, to a serving cell base station device (not shown).

User equipment device 102, subsequent to initiating communication using alternate radio access technologies, can send a message to position determination entity device 104 via the serving cell base station device. The message sent to the position determination entity device 104 can represent a request for appropriate measurement gap data for use by location based services. User equipment device 102 then can place itself in a hiatus state or in a state of stasis to conserve battery power until, for example, a response is received from position determination entity device 104.

User equipment device 102, in response to receiving a request from the serving cell base station device through which user equipment device 102 initiated communication with the radio access network can perform inter-band pilot signal scanning and/or inter-technology pilot signal scanning (e.g., LTE, NB-LTE, LTE-M, etc.) for neighboring base station devices (e.g., access points, eNodeB devices, . . . ) during measurement gap intervals that have been indicated by, and supplied by, position determining entity device 104 to the serving cell base station device. The intra-band pilot signal measurement data, inter-band pilot signal measurement data, and/or inter-technology pilot signal measurement data, can be sampled periodically (e.g., every y milliseconds) by user equipment device 102. The result of the periodic sampling can then be sent to position determination entity device 104. Generally, user equipment device 102 can determine the sufficiency of the number of samples collected based on the number of pilot signals that it detects during a fixed or defined time interval (e.g., a measurement gap interval). User equipment device 102 can scan for LTE/CIoT signal pilot signals during LTE measurement gaps and then can compile a measurement report. The measurement reports collected by user equipment device 102 during one or more measurement gap periods can then be sent to base station devices, such as eNodeB devices. The base station devices can use the data contained in measurement reports received from user equipment device 102 for purposes of handover and/or for location based service ranging.

In regard to the foregoing, it should be noted without limitation or loss of generality, aggressive measurement gap patterns (e.g., scanning by user equipment device 102 with a periodicity of approximately every 40 milliseconds) can yield faster triangulations in comparison with relaxed measurement gap patterns (e.g., scanning by user equipment device 102 with a periodicity set to approximately 80 ms). However, there can be a tradeoff as aggressive measurement patterns can tend to drain user equipment device 102 battery power much faster. Additionally, while the LTE technical specification defines LTE-measurement gaps as being either pattern 0 (a measurement gap with a periodicity of approximately every 40 milliseconds) or pattern 1 (a measurement gap with a periodicity of approximately every 80 milliseconds), the LTE technical standard can be modified to accept a greater or lesser number of LTE-measurement gaps. Accordingly, if necessary, a very-aggressive measurement gap pattern can be defined wherein the measurement gap can have a periodicity of approximately every 20 milliseconds can be utilized. Conversely, where appropriate, an extremely-sluggish measurement gap pattern can be defined so that the measurement gap can have periodicity of approximately 160 milliseconds.

Additionally, in the context of the foregoing, pilot signal measurements (e.g., intra-band, inter-band, and/or inter-technology) can be sampled by user equipment device 102 at a defined periodicity (e.g., every y milliseconds), whereupon the results of the sampling can be reported to position determination entity device 104. Small values of y can refer to user equipment device 102 sending frequent updates to position determination entity device 104 which can cause the battery life of user equipment device 102 to rapidly drain. In contrast, large values of y refers to user equipment device 102 sending less frequent updates to position determination entity device 104 which can extend the battery life of user equipment device 102.

Typically, user equipment device 102 will only scan technologies and/or frequency bands that are likely to provide accurate signal reading information for triangulation. For example, if position determining entity device 104 determines that user equipment device 102 is located in an area where LTE-M (300 megahertz (MHz) and 900 MHz), NB-LTE (400 MHz), and LTE (1.8 gigahertz (GHz)) compliant base station devices are operational, user equipment device 102 can be requested to only scan LTE-M (300 MHz) and NB-LTE (400 MHz) since low frequency bands CIoT technologies are more likely to penetrate an indoor location. Scanning for frequency bands or technologies that user equipment device 102 cannot receive at its current location can be a waste of time and user equipment device 102 battery power.

The decision as to whether user equipment device 102 should use an aggressive measurement gap pattern, a relaxed measurement gap pattern, a sluggish measurement gap pattern, or very aggressive measurement gap pattern can be based on an emergency level. The emergency level can be based on whether a location based service request comes from an application, such as a social networking application, or the location based service request is associated with an emergency situation (e.g., 911 call). Where the location based service request comes from a social networking application a sluggish measurement gap pattern can be implemented. Conversely, where the location based service request is associated with an emergency situation, a very aggressive measurement gap pattern can be implemented.

In regard to measurement gaps, when user equipment device 102 is in RRC_CONNECTED mode, it can continuously measure signal power of its current frequency and can report these measurement back to a serving cell base station device. If the reported signal power falls below a predetermined threshold (e.g., user equipment device 102 is getting out of the coverage area of the serving cell base station device), the serving cell base station device can request that user equipment device 102 perform LTE inter-frequency measurements and/or inter-radio access technology (RAT) measurements. Typically, the serving cell base station device sends measurement configuration data to user equipment device 102, which can include measurement gap pattern sequences. During measurement gaps, user equipment device 102 can inactivate reception and transmission activities with serving cell base station device placing these activities in a state of stasis. The LTE measurement gap patterns can comprise gaps every N LTE frames (e.g., the gap periodicity is a multiple of 10 milliseconds), where N denotes an integer value. Generally, the measurement gap length (MGL) is generally 6 milliseconds in duration. A single measurement gap pattern can typically be used to monitor all possible radio access technologies (inter-frequency LTE FDD (frequency-division duplex) and TDD (time-division duplex), UMTS, etc.). As is noted earlier, two gap patterns "pattern 0" and "pattern 1" have been defined in the LTE technical standard. LTE technical standard also provides for a gap length of approximately 6 milliseconds, using two different measurement gap repetition rates (MPRG) of 40 milliseconds or 80 milliseconds. Measurement reports collected during measurement gaps are sent by user equipment device 102 to the serving cell base station device. The serving cell base station device can then use this information for purposes of handover or for ranging in the context of location based services.

Position determination entity device 104 in response to receiving, via a serving cell base station device, a message from user equipment device 102, position determination entity device 104 can determine the location of user equipment device 102 based, for example, on geographical coordinates (e.g., latitude and/or longitude coordinates) or one or more geo-location tags assigned by a mobile network operator to the serving cell base station device. Once position determination entity device 104 has determined the location of user equipment device 102 based on the geographical coordinates assigned to the serving cell base station device, position determination entity device 104 can request multi-band network topology data and/or multi-technology network topology data from a LTE-EMS core network device. The multi-band network topology data and/or multi-technology network topology data can be used to estimate the frequency bands and/or technologies that are available at the location where user equipment device 102 is currently located. Position determination entity device 104 can also determine a probability that can be associated with a likelihood that user equipment device 102 will successfully receive the signals at the indoor location and which user equipment device 102 is located. Based on the frequency bands and/or technologies and/or the determined probabilities, position determination entity device 104 can determine which of the frequency bands and/or technologies can be best used by user equipment device 102 to scan, and the corresponding pilot signal scanning periodicity. Thereafter, position determination entity device 104 responds to the earlier received message received from user equipment device 102 by sending measurement gap data to the serving cell base station device, whereupon the serving cell base station device sends a request to user equipment device 102 to perform inter-band and/or inter technology pilot signal scanning (LTE, NB-LTE, LTE-M) for neighboring base station devices during defined or definable measurement gap intervals.

Figure 2:
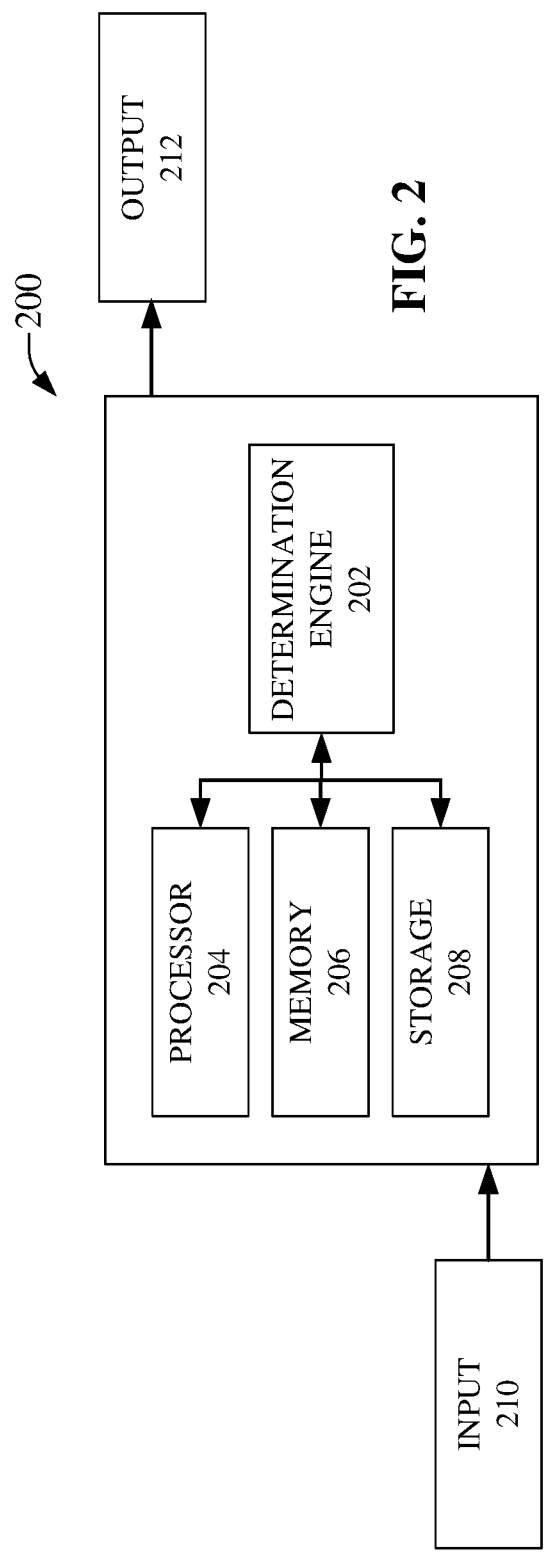
FIG. 2 is a further depiction of a system that provides enhanced location based services for hybrid long term evolution (LTE) and/or Cellular Internet of Things (CIoT) networks, in accordance with aspects of the subject disclosure.

FIG. 2 provides illustration of user equipment device 102, now labeled as system 200, for the provision of enhanced location based services for hybrid long term evolution (LTE) and/or Cellular Internet of Things (CIoT) networks. System 200 can include determination engine 202 that can be coupled to processor 204, memory 206, and storage 208. Determination engine 202 can be in communication with processor 204 for facilitating operation of computer or machine executable instructions and/or components by determination engine 202, memory 206, for storing data and/or the computer or machine executable instructions and/or components, and storage 208 for providing longer term storage of data and/or machine and/or computer readable instructions. Additionally, system 200 can also receive input 210 for use, manipulation, and/or transformation by determination engine 202 to produce one or more useful, concrete, and tangible result, and/or transform one or more articles to different states or things. Further, system 200 can also generate and output the useful, concrete, and tangible results and/or the transformed one or more articles produced by determination engine 202 and output as output 212.

System 200, solely for purposes of elucidation, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Determination engine 102, based on a determination that the LTE signal has become weak and/or attenuated (e.g., the LTE signal strength has fallen below an first established threshold) and/or that there is an insufficiency of pilot signals (e.g., the number of pilot signals has fallen below a second established threshold) to provide an accurate location, determination engine 102 can initiate communication with the network through any available radio access technology (e.g., LTE, LTE-M, NB-LTE, . . . ). Determination engine 102 can thereafter send a message, through its serving cell base station device, to a position determination entity device (e.g., position determination entity device 104) requesting measurement gap information for use by a location based service. Determination engine 102 can thereafter place itself in a sleep state.

Determination engine 102, in response to receiving a request from the serving cell base station device through which user equipment device 102 initiated communication with the radio access network, can take itself out of the sleep state and thereafter can perform inter-band pilot signal scanning and/or inter-technology pilot signal scanning (e.g., LTE, NB-LTE, LTE-M, etc.) for neighboring base station devices (e.g., access point devices, eNodeB devices, devices that have implemented technologies associated with NB-LTE, devices that have implemented technologies associated with LTE-M, . . . ) during measurement gap intervals that have been indicated by, and supplied by, a position determining entity device 104 to the serving cell base station device. The intra-band pilot signal measurement data, inter-band pilot signal measurement data, and/or inter-technology pilot signal measurement data, can be sampled periodically (e.g., every y milliseconds) by determination engine 202. The result of the periodic sampling can then be sent to position determination entity device 104. Generally, determination engine 202 can determine the sufficiency of the number of samples collected based on the number of pilot signals that it detects during a fixed or defined time interval (e.g., a measurement gap interval). Determination engine 202 can scan for LTE/CIoT signal pilot signals during LTE measurement gaps and then can compile a measurement report. The measurement reports collected by determination engine 202 during one or more measurement gap periods can then be sent to base station devices other than the current serving cell base station device. The other base station devices can use the data contained in measurement reports received from determination engine 202 for purposes of handover and/or for location based service ranging.

Figure 3:
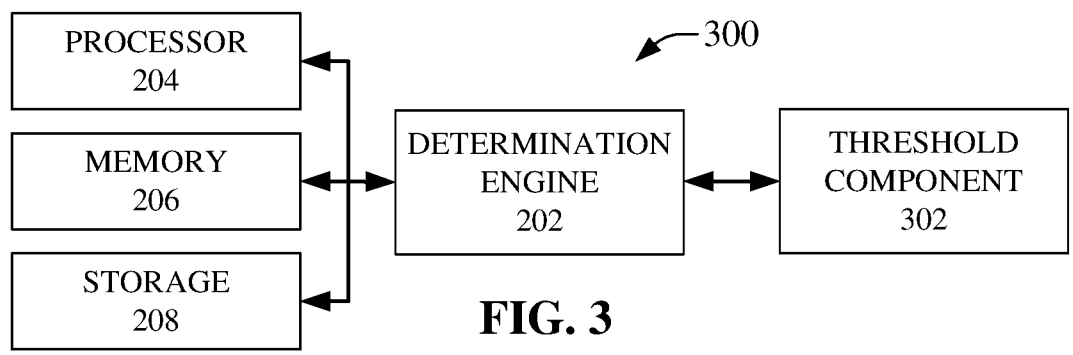
FIG. 3 provides illustration of an additional system that provides enhanced location based services for hybrid long term evolution (LTE) and/or Cellular Internet of Things (CIoT) networks, in accordance with aspects of the subject disclosure.

FIG. 3 provides additional illustration of user equipment device 102, now represented as system 300, that in accordance with various embodiments provides for the provision of enhanced location based services for hybrid long term evolution (LTE) and/or Cellular Internet of Things (CIoT) networks. In this depiction, system 300 can comprise determination engine 202 that can be communicatively coupled to processor 204, memory 206, and storage 208. Additionally, communicatively coupled to determination engine 202 can be threshold component 302. Determination engine 202 in conjunction with threshold component 302 determine whether or not the LTE signal has become attenuated or weakened as a function of the number of LTE pilot signals that have been received within a defined or definable time period falls below a defined or definable threshold. As noted earlier, the number of LTE pilot signals received within a defined duration of time can typically be used by user equipment device 102 to provide accurate positional information in regard to the location of user equipment device 102. Usually, the number of LTE pilot signals necessary to provide accurate positional data in regard to location should exceed two pilot signals. Threshold component 302 can determine whether or not, within a definable time period, the number of LTE pilot signals that have been received fails to exceed a definable threshold value.

Figure 4:
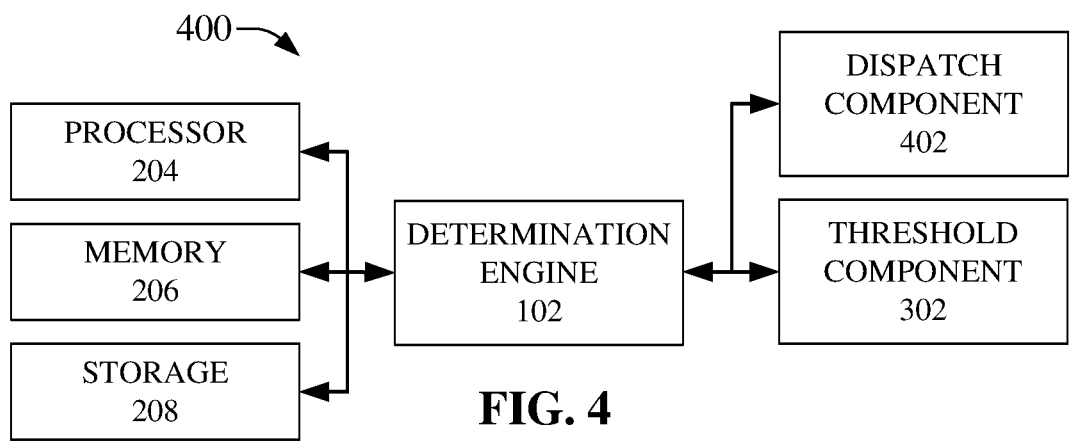
FIG. 4 provides another illustration of a system that provides enhanced location based services for hybrid long term evolution (LTE) and/or Cellular Internet of Things (CIoT) networks, in accordance with aspects of the subject disclosure.

FIG. 4 provides additional illustration of user equipment device 102, now represented as system 400, that in accordance with various embodiments provides for the provision of enhanced location based services for hybrid long term evolution (LTE) and/or Cellular Internet of Things (CIoT)

networks. In this illustration, system 400 can comprise determination engine 202 that can be communicatively coupled to threshold component 302, processor 204, memory 206, and storage 208. Additionally, communicatively coupled to determination engine 202 can be dispatch component 402. Dispatch component 402 in response to threshold component 302 determining that fewer LTE pilot signals than the definable threshold value have been received within the defined time period can initiate communication to the radio access network (RAN), using an available alternate radio access technology, such as NB-LTE and/or LTE-M, to a serving cell base station device.

Figure 5:
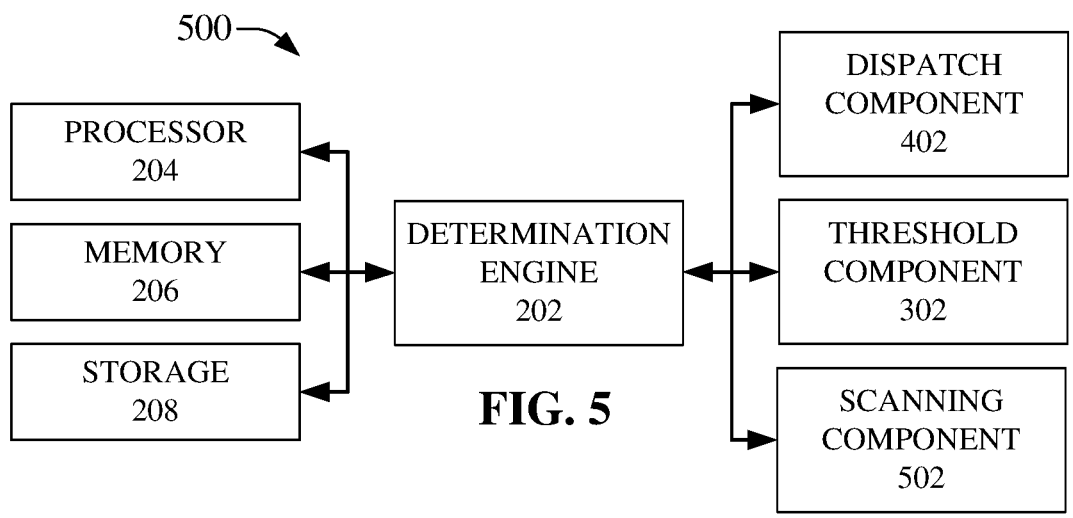
FIG. 5 illustrates another depiction of a system that provides enhanced location based services for hybrid long term evolution (LTE) and/or Cellular Internet of Things (CIoT) networks, in accordance with aspects of the subject disclosure.

FIG. 5 provides additional depiction of user equipment device 102, now represented as system 500, that in accordance with various embodiments provides for the provision of enhanced location based services for hybrid long term evolution (LTE) and/or Cellular Internet of Things (CIoT) networks. In this illustration, system 500 can comprise determination engine 202 that can be communicatively coupled to dispatch component 402, threshold component 302, processor 204, memory 206, and storage 208. Additionally, communicatively coupled to determination engine 202 can be scanning component 502.

Scanning component 502, in response to user equipment device 102 receiving a request from the serving cell base station device through which user equipment device 102 initiated communication with the radio access network, can perform inter-band pilot signal scanning and/or inter-technology pilot signal scanning (e.g., LTE, NB-LTE, LTE-M, etc.) for neighboring base station devices during measurement gap intervals that have been indicated by, and supplied by, position determining entity device 104 to the serving cell base station device.

Figure 6:
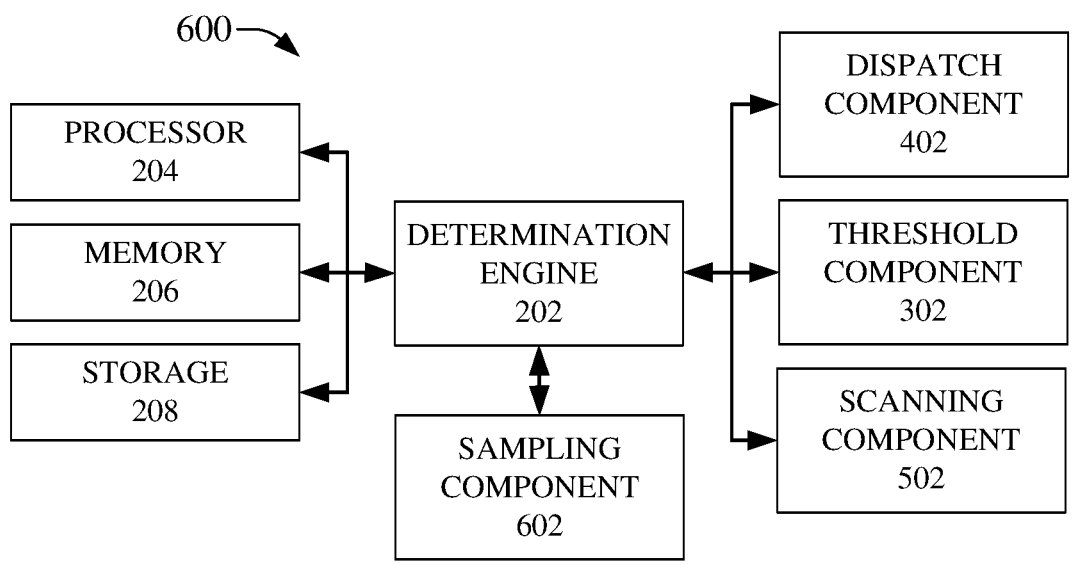
FIG. 6 depicts a further system that provides enhanced location based services for hybrid long term evolution (LTE) and/or Cellular Internet of Things (CIoT) networks, in accordance with aspects of the subject disclosure.

FIG. 6 provides further depiction of user equipment device 102, now represented as system 600, that in accordance with various embodiments provides for the provision of enhanced location based services for hybrid long term evolution (LTE) and/or Cellular Internet of Things (CIoT) networks. In this illustration, system 600 can comprise determination engine 202 that can be communicatively coupled to sampling component 502, dispatch component 402, threshold component 302, processor 204, memory 206, and storage 208. Additionally, communicatively coupled to determination engine 202 can be sampling component 602.

Intra-band pilot signal measurement data, inter-band pilot signal measurement data, and/or inter-technology pilot signal measurement data, can be sampled periodically (e.g., every y milliseconds) by sampling component 602. The result of the periodic sampling can then be sent to position determination entity device 104. Generally, sampling component 602 can determine the sufficiency of the number of samples collected based on the number of pilot signals that it detects during a fixed or defined time interval (e.g., a measurement gap interval). Scanning component 502 and/or sampling component 602 can scan for LTE/CIoT signal pilot signals during LTE measurement gaps and then can compile a measurement report. The measurement reports collected by user equipment device 102 during one or more measurement gap periods can then be sent to base station devices, such as eNodeB devices. The base station devices can use the data contained in measurement reports received from user equipment device 102 for purposes of handover and/or for location based service ranging.

Figure 7:
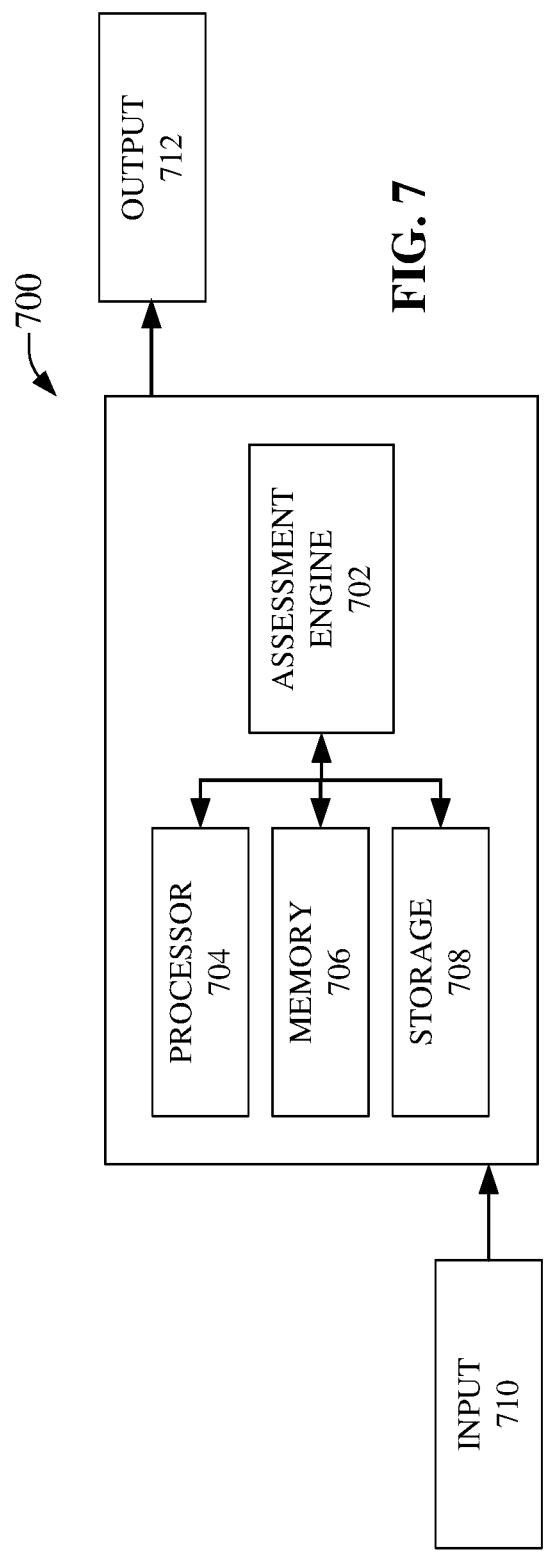
FIG. 7 depicts a another system that provides enhanced location based services for hybrid long term evolution (LTE) and/or Cellular Internet of Things (CIoT) networks, in accordance with aspects of the subject disclosure.

FIG. 7 provides illustration of position determining entity device 104, now represented as system 700 that in accordance with various embodiments provides for the provision of enhanced location based services for hybrid long term evolution (LTE) and/or Cellular Internet of Things (CIoT) networks. System 700 can include assessment engine 702 that can be coupled to processor 704, memory 706, and storage 708. Assessment engine 702 can be in communication with processor 704 for facilitating operation of computer or machine-executable instructions and/or components by assessment engine 702, memory 706 for storing data and/or the computer or machine-executable instructions and/or components, and storage 708 for providing longer term storage of data and/or machine and/or computer readable instructions. Additionally, system 700 can also receive input 710 for use, manipulation, and/or transformation by assessment engine 702 to produce one or more useful, concrete, and tangible result, and/or transform one or more articles to different states or things. Further, system 700 can also generate and output the useful, concrete, and tangible results and/or the transformed one or more articles produced by assessment engine 702 and output as output 712.

System 700, for purposes of exposition, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 700 can include devices and instrumentalities associated with satellite technologies, devices included in automotive vehicles, tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Assessment engine 702, in response to receiving, via a serving cell base station device, a message from user equipment device 102, can determine the location of user equipment device 102 based, for example, on geographical coordinates (e.g., latitude and/or longitude coordinates) or geolocation tags assigned by a mobile network operator to the serving cell base station device. Assessment engine 702, based on the location of user equipment device 102 in relation to the serving cell base station device, can request multi-band network topology data and/or multi-technology network topology data from a LTE-EMS core network device. Assessment engine 702 can employ the multi-band network topology data and/or multi-technology network topology data to determine the frequency bands and/or technologies that are extant at the location where user equipment device 102 is currently located. Assessment engine 702 can also determine a probability that can be associated with a likelihood that user equipment device 102 will successfully receive the signals at the indoor location and in which user equipment device 102 is located. Based on the frequency bands and/or technologies and/or the determined probabilities, assessment engine 702 can determine which of the frequency bands and/or technologies can be best utilized by user equipment device 102 to scan, and the corresponding pilot signal scanning periodicity that user equipment device 102 should use to perform the pilot signal scanning. Assessment engine 702 can thereafter respond to the earlier received message received from user equipment device 102 by sending measurement gap data to the serving cell base station device. The serving cell base station device can then send a request to user equipment device 102 to perform inter-band and/or inter technology pilot signal scanning (LTE, NB-LTE, LTE-M) for neighboring base station devices during defined or definable measurement gap intervals.

Figure 8:
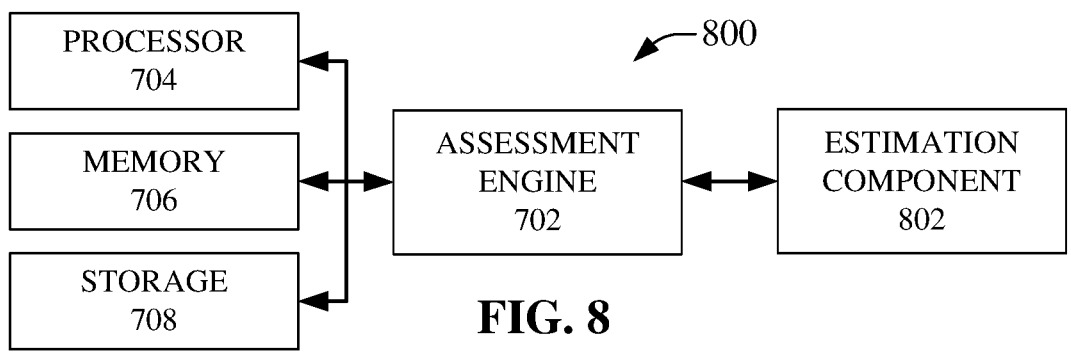
FIG. 8 depicts an additional system that provides enhanced location based services for hybrid long term evolution (LTE) and/or Cellular Internet of Things (CIoT) networks, in accordance with aspects of the subject disclosure.

FIG. 8 provides additional depiction of position determining entity device 104, now represented as system 800 that in accordance with various embodiments provides for the provision of enhanced location based services for hybrid long term evolution (LTE) and/or Cellular Internet of Things (CIoT) networks. As illustrated, system 800 can comprise estimation component 802 operatively coupled to assessment engine 702, processor 704, memory 706, and storage 708. Estimation component 802, in response to receiving, via a serving cell base station device, a message from user equipment device 102, can determine the location of user equipment device 102 based, for example, on geographical coordinates (e.g., latitude and/or longitude coordinates) or geo-location tags assigned by a mobile network operator to the serving cell base station device.

Figure 9:
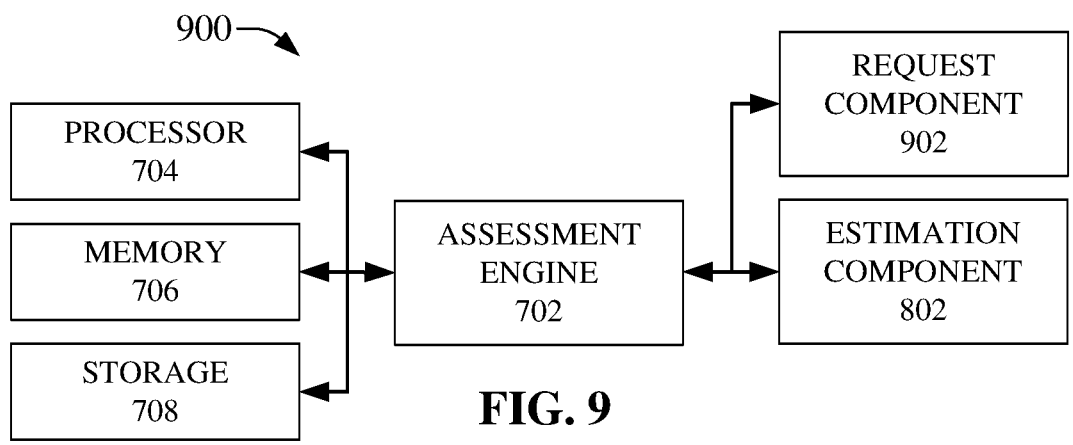
FIG. 9 illustrates another system that provides enhanced location based services for hybrid long term evolution (LTE) and/or Cellular Internet of Things (CIoT) networks, in accordance with aspects of the subject disclosure.

FIG. 9 provides an additional illustration of position determining entity device 104, now represented as system 900 that in accordance with various embodiments provides for the provision of enhanced location based services for hybrid long term evolution (LTE) and/or Cellular Internet of Things (CIoT) networks. As illustrated, system 900 can comprise request component 902 communicatively coupled to assessment engine 702, processor 704, memory 706, and storage 708. Request component 902, based on the location of user equipment device 102 in relation to the serving cell base station device, can request multi-band network topology data and/or multi-technology network topology data from a LTE-EMS core network device. Request component 902 can employ the multi-band network topology data and/or multi-technology network topology data to determine the frequency bands and/or technologies that are extant at the location where user equipment device 102 is currently located.

Figure 10:
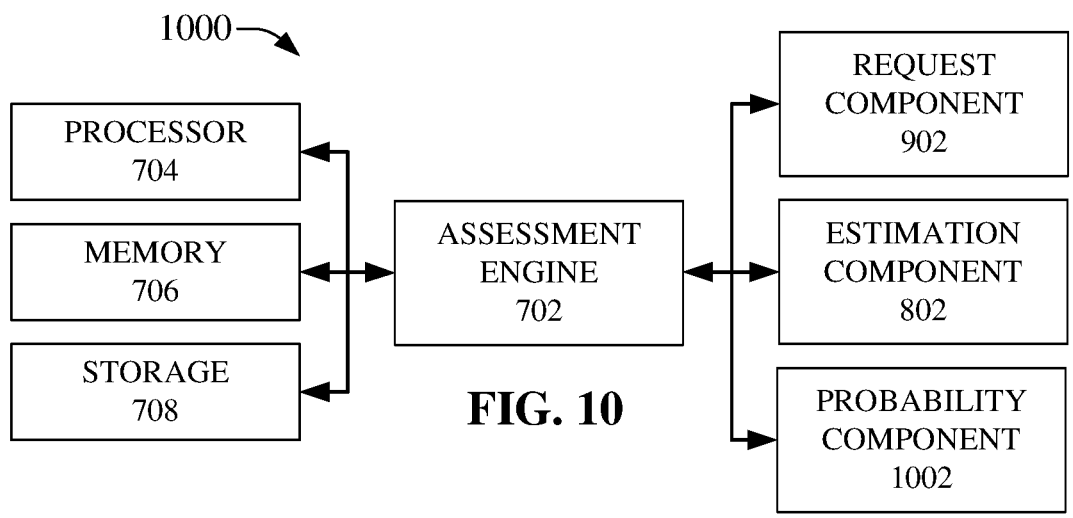
FIG. 10 illustrates a further system that provides enhanced location based services for hybrid long term evolution (LTE) and/or Cellular Internet of Things (CIoT) networks, in accordance with aspects of the subject disclosure.

FIG. 10 provides a further illustration of position determining entity device 104, now represented as system 1000 that in accordance with various embodiments provides for the provision of enhanced location based services for hybrid long term evolution (LTE) and/or Cellular Internet of Things (CIoT) networks. As illustrated, system 1000 can comprise probability component 1002 operatively coupled to assessment engine 702, processor 704, memory 706, and storage 708. Probability component 1002 can determine a probability that can be associated with a likelihood that user equipment device 102 will successfully receive signals at an indoor location in which user equipment device 102 is located.

Figure 11:
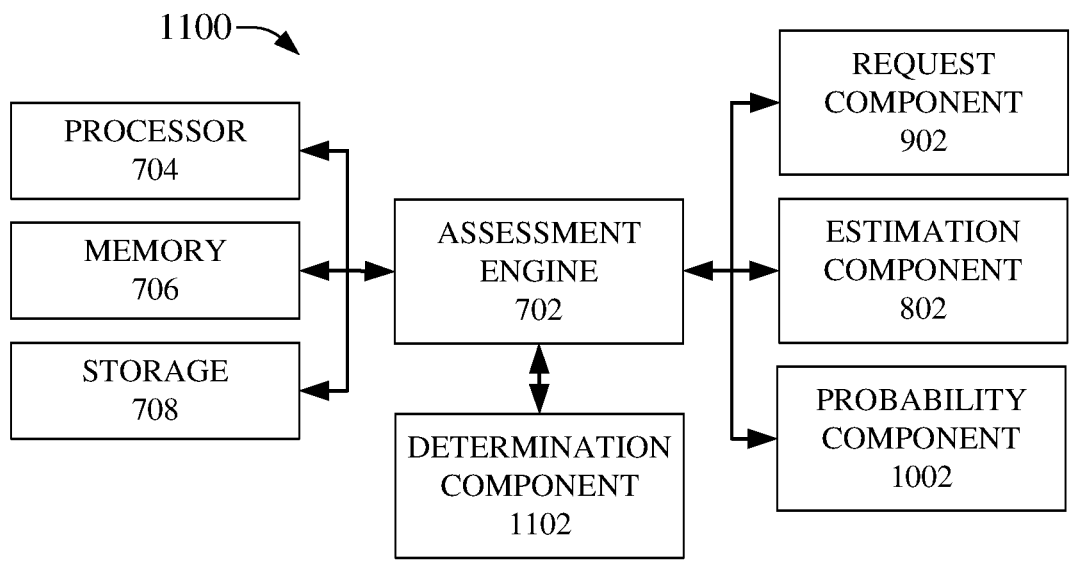
FIG. 11 depicts an additional system that provides enhanced location based services for hybrid long term evolution (LTE) and/or Cellular Internet of Things (CIoT) networks, in accordance with aspects of the subject disclosure.

FIG. 11 provides further illustration of position determining entity device 104, now represented as system 1100 that in accordance with various embodiments provides for the provision of enhanced location based services for hybrid long term evolution (LTE) and/or Cellular Internet of Things (CIoT) networks. As illustrated, system 1100 can comprise determination component 1102 communicatively coupled to assessment engine 702, processor 704, memory 706, and storage 708. Based on the frequency bands and/or technologies, determined by request component 902 and/or the determined probabilities determined by probability component 1002, determination component 1102 can determine which of the frequency bands and/or technologies can be best utilized by user equipment device 102 to scan, and the corresponding pilot signal scanning periodicity that user equipment device 102 should use to perform the pilot signal scanning.

Figure 12:
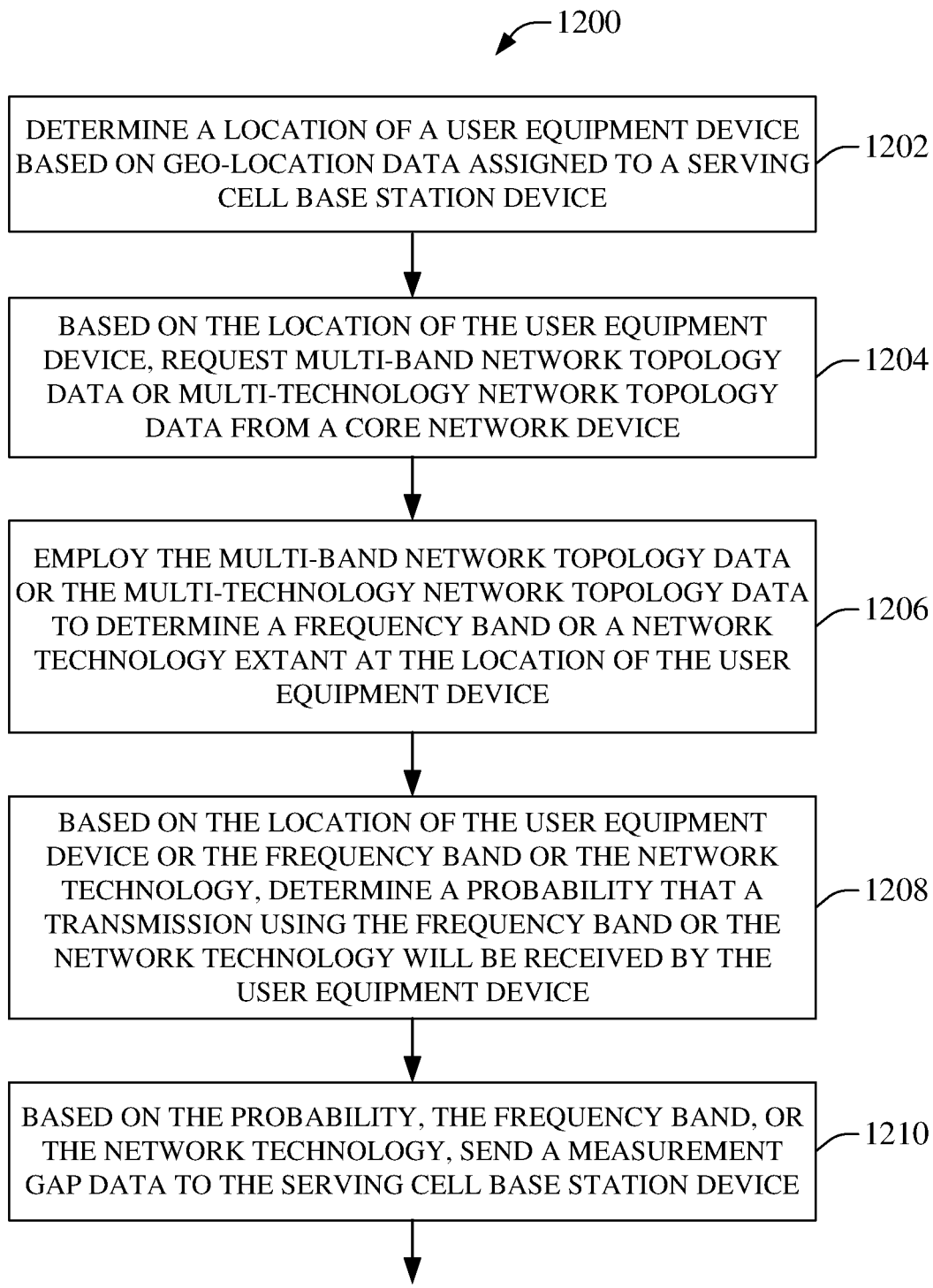
FIG. 12 provides illustration of a flow chart or method for the provision of enhanced location based services for hybrid long term evolution (LTE) and/or Cellular Internet of Things (CIoT) networks, in accordance with aspects of the subject disclosure.

In view of the example system(s) described above, example method(s) that can be implemented in accordance with the disclosed subject matter can be better appreciated with reference to the flowcharts in FIG. 12. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 12 illustrates a method 1200 for the provision of enhanced location based services for hybrid long term evolution (LTE) and/or Cellular Internet of Things (CIoT) networks. Method 1200 can commence at act 1202 wherein, system 700 (e.g., position determination entity device 104), can determine a location of a user equipment device (e.g., user equipment device 102) based on geo-location data assigned to a serving cell base station device by a mobile network operator. At 1204, based on the location of the user equipment device, system 700 can request multi-band network topology data and/or multi-technology network topology data from a core network device (e.g., LTE-EMS device). At 1206, system 700 can employ the multi-band network topology data and/or the multi-technology network topology data to determine a frequency band and/or a network technology extant at the location (or within the proximity) of the user equipment device. At 1208, system 700, based on the location of the user equipment device and/or the determined frequency band and/or the determined network technology, can further determine a probability (or a likelihood) that a transmission using the determined frequency band and/or the determined network technology will successfully be received by the user equipment device. At 1210, system 700, based on the determined probability, the determined frequency band, or the determined network technology, can send measurement gap data to the serving cell base station device.

It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 13:
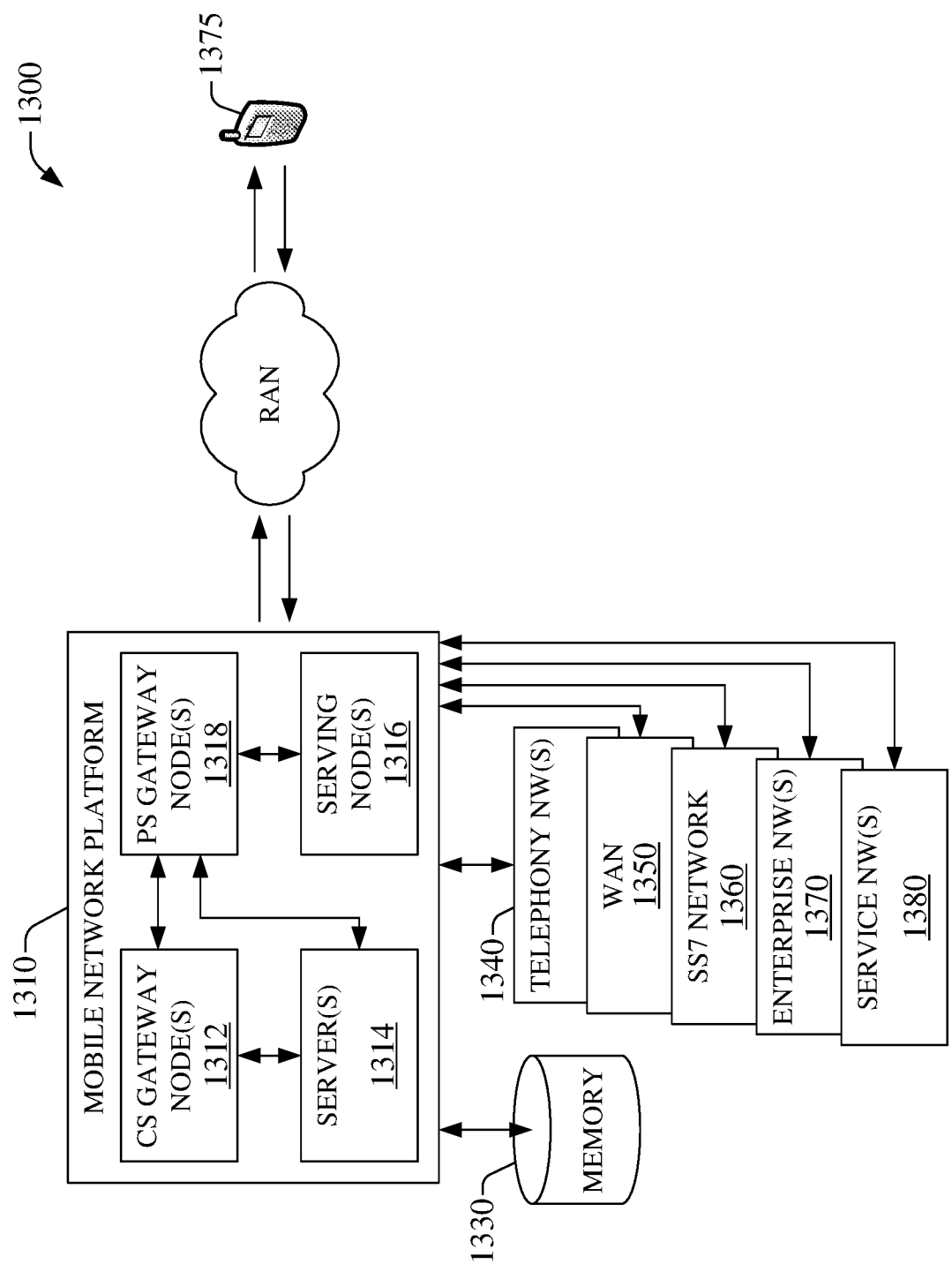
FIG. 13 is a block diagram of an example embodiment of a mobile network platform to implement and exploit various features or aspects of the subject disclosure.

FIG. 13 presents an example embodiment 1300 of a mobile network platform 1310 that can implement and exploit one or more aspects of the disclosed subject matter described herein. Generally, wireless network platform 1310 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1310 can be included in telecommunications carrier networks, and can be considered carrier-side components as discussed elsewhere herein. Mobile network platform 1310 includes CS gateway node(s) 1312 which can interface CS traffic received from legacy networks like telephony network(s) 1340 (e.g., public switched telephone network (PSTN), or public land mobile network (PLMN)) or a signaling system #7 (SS7) network 1370. Circuit switched gateway node(s) 1312 can authorize and authenticate traffic (e.g., voice) arising from such networks. Additionally, CS gateway node(s) 1312 can access mobility, or roaming, data generated through SS7 network 1360; for instance, mobility data stored in a visited location register (VLR), which can reside in memory 1330. Moreover, CS gateway node(s) 1312 interfaces CS-based traffic and signaling and PS gateway node(s) 1318. As an example, in a 3GPP UMTS network, CS gateway node(s) 1312 can be realized at least in part in gateway GPRS support node(s) (GGSN). It should be appreciated that functionality and specific operation of CS gateway node(s) 1312, PS gateway node(s) 1318, and serving node(s) 1316, is provided and dictated by radio technology(ies) utilized by mobile network platform 1310 for telecommunication.

In addition to receiving and processing CS-switched traffic and signaling, PS gateway node(s) 1318 can authorize and authenticate PS-based data sessions with served mobile devices. Data sessions can include traffic, or content(s), exchanged with networks external to the wireless network platform 1310, like wide area network(s) (WANs) 1350, enterprise network(s) 1370, and service network(s) 1380, which can be embodied in local area network(s) (LANs), can also be interfaced with mobile network platform 1310 through PS gateway node(s) 1318. It is to be noted that WANs 1350 and enterprise network(s) 1370 can embody, at least in part, a service network(s) like IP multimedia subsystem (IMS). Based on radio technology layer(s) available in technology resource(s) 1317, packet-switched gateway node(s) 1318 can generate packet data protocol contexts when a data session is established; other data structures that facilitate routing of packetized data also can be generated. To that end, in an aspect, PS gateway node(s) 1318 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1300, wireless network platform 1310 also includes serving node(s) 1316 that, based upon available radio technology layer(s) within technology resource(s) 1317, convey the various packetized flows of data streams received through PS gateway node(s) 1318. It is to be noted that for technology resource(s) 1317 that rely primarily on CS communication, server node(s) can deliver traffic without reliance on PS gateway node(s) 1318; for example, server node(s) can embody at least in part a mobile switching center. As an example, in a 3GPP UMTS network, serving node(s) 1316 can be embodied in serving GPRS support node(s) (SGSN).

For radio technologies that exploit packetized communication, server(s) 1314 in wireless network platform 1310 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1310. Data streams (e.g., content(s) that are part of a voice call or data session) can be conveyed to PS gateway node(s) 1318 for authorization/authentication and initiation of a data session, and to serving node(s) 1316 for communication thereafter. In addition to application server, server(s) 1314 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1310 to ensure network's operation and data integrity in addition to authorization and authentication procedures that CS gateway node(s) 1312 and PS gateway node(s) 1318 can enact. Moreover, provisioning server(s) can provision services from external network(s) like networks operated by a disparate service provider; for instance, WAN 1350 or Global Positioning System (GPS) network(s) (not shown). Provisioning server(s) can also provision coverage through networks associated to wireless network platform 1310 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1375.

It is to be noted that server(s) 1314 can include one or more processors configured to confer at least in part the functionality of macro network platform 1310. To that end, the one or more processor can execute code instructions stored in memory 1330, for example. It is should be appreciated that server(s) 1314 can include a content manager 1315, which operates in substantially the same manner as described hereinbefore.

In example embodiment 1300, memory 1330 can store information related to operation of wireless network platform 1310. Other operational information can include provisioning information of mobile devices served through wireless platform network 1310, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1330 can also store information from at least one of telephony network(s) 1340, WAN 1350, enterprise network(s) 1370, or SS7 network 1360. In an aspect, memory 1330 can be, for example, accessed as part of a data store component or as a remotely connected memory store.

Figure 14:
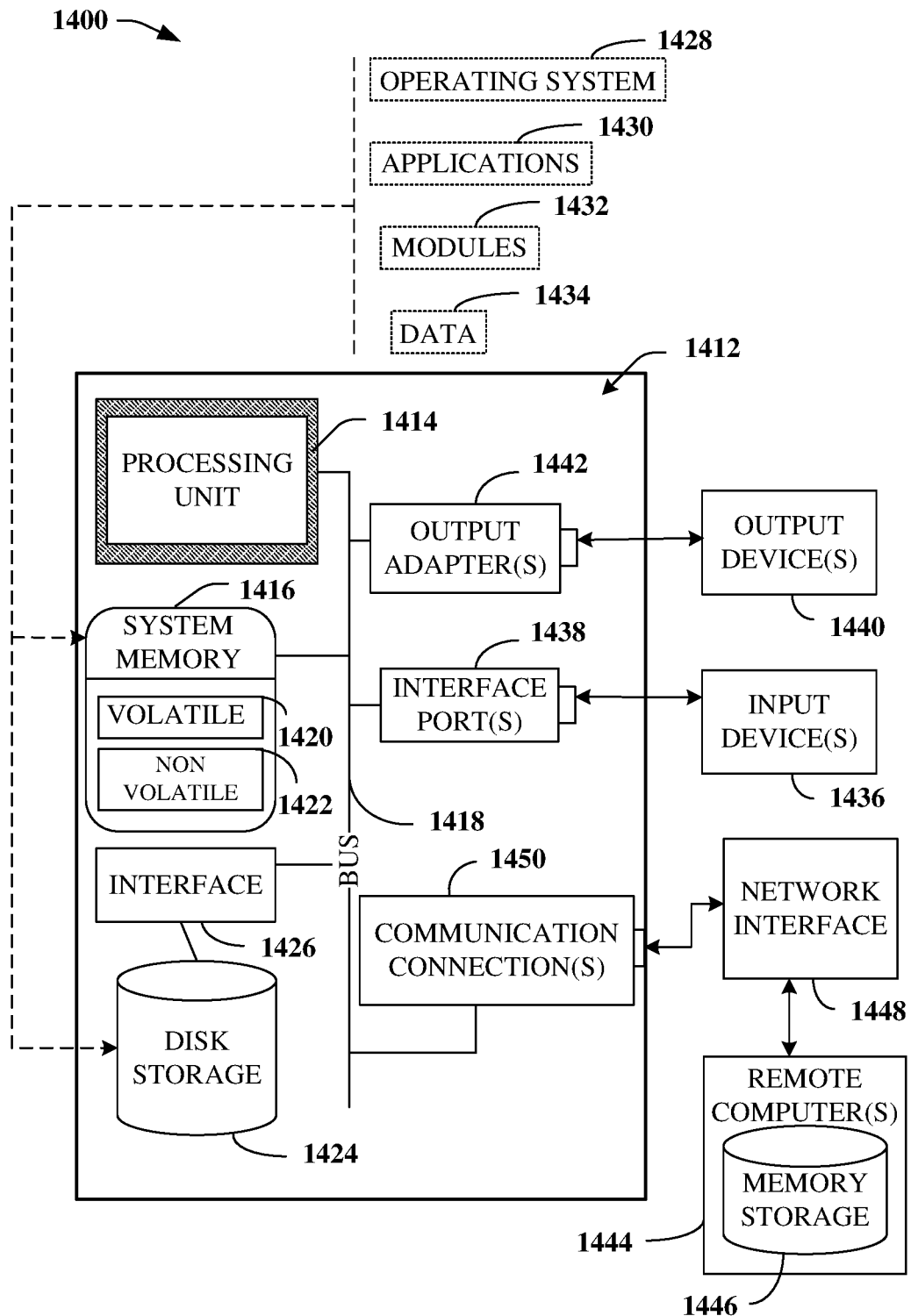
FIG. 14 illustrates a block diagram of a computing system operable to execute the disclosed systems and methods in accordance with an embodiment.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1420 (see below), non-volatile memory 1422 (see below), disk storage 1424 (see below), and memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1400 operable to execute the disclosed systems and methods in accordance with an embodiment. Computer 1412, which can be, for example, part of the hardware of system 100, includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1416 can include volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 can also include removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software includes an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1412 through input device(s) 1436. As an example, mobile device and/or portable device can include a user interface embodied in a touch sensitive display panel allowing a user to interact with computer 1412. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 include, for example, a serial port, a parallel port, a game port, a universal serial bus (USB), an infrared port, a Bluetooth port, an IP port, or a logical port associated with a wireless service, etc. Output device(s) 1440 use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440 like monitors, speakers, and printers, among other output devices 1440, which use special adapters. Output adapters 1442 include, by way of illustration and not limitation, video and sound cards that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, cloud storage, cloud service, a workstation, a microprocessor based appliance, a peer device, or other common network node and the like, and typically includes many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically connected by way of communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory"

or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. Network equipment, comprising:
a processor; and
a memory that stores executable instructions that, when executed by the processor, facilitate performance of operations, comprising:
based on a first message received from a user equipment via a radio access technology and based on a serving cell location of serving cell equipment that services the user equipment, determining, a location of the user equipment, wherein the first message represents a request for measurement gap information for a location based service;
based on the user equipment being determined to be at an indoor location, determining a probability that the user equipment receives a signal transmitted via the radio access technology; and
based on the probability, transmitting, to the user equipment, a second message comprising data representative of the measurement gap information.

2. The network equipment of claim 1, wherein the operations further comprise determining a frequency band available at the location of the user equipment.

3. The network equipment of claim 1, wherein the operations further comprise determining the radio access technology available at the location of the user equipment.

4. The network equipment of claim 1, wherein the operations further comprise, based on a frequency band being available at the location of the user equipment, determining a pilot signal scanning periodicity that the user equipment uses to scan for a frequency band available at the location of the user equipment.

5. The network equipment of claim 1, wherein the operations further comprise, based on a radio access technology being available at the location of the user equipment, determining a pilot signal scanning periodicity that the user equipment uses to scan for the radio access technology available at the location of the user equipment.

6. The network equipment of claim 1, wherein the operations further comprise facilitating the serving cell equipment to request the user equipment to perform an inter-band pilot signal scan for a neighbor base station equipment during a measuring gap interval provided in the measuring gap information.

7. The network equipment of claim 1, wherein the operations further comprise facilitating the serving cell equipment to request the user equipment to perform an inter-technology pilot signal scan for a neighbor base station equipment during a measuring gap interval provided in the measuring gap information.

8. The network equipment of claim 7, wherein the operations further comprise facilitating, by the serving cell equipment, the user equipment to return a pilot signal measurement within a defined period of time.

9. A method, comprising:
facilitating, by equipment comprising a processor, determining a first location of the equipment in relation to a second location of network equipment;
facilitating, by the equipment, determining that the first location is an indoor location;
facilitating, by the equipment, determining a probability that the equipment will receive a signal transmitted via the radio access technology;
based on the probability, receiving, by the equipment, data representing measurement gap information for a location based service; and
in response to receiving the data, performing, by the equipment, an inter-band pilot signal scan for neighbor base station equipment during a defined measurement gap interval.

10. The method of claim 9, wherein the defined measurement gap interval is included in the data.

11. The method of claim 9, further comprising, in response to receiving the data, performing, by the equipment, an inter-technology pilot signal scan for the neighbor base station equipment during the defined measurement gap interval.

12. The method of claim 9, further comprising performing, by the equipment, an intra-band pilot signal measurement with a defined time periodicity.

13. The method of claim 9, further comprising performing, by the equipment, an inter-band pilot signal measurement with a defined time periodicity.

14. The method of claim 9, further comprising performing, by the equipment, an inter-technology pilot signal measurement with a defined time periodicity.

15. A non-transitory machine-readable medium, comprising executable instructions that, when executed by the processor, facilitate performance of operations, comprising:
determining, based on a first message received from a user equipment via a radio access technology, a location of the user equipment based on a serving cell location of serving cell equipment that services the user equipment, wherein the first message represents a request for measurement gap information for a location based service;
determining a probability that the user equipment receives a signal transmitted via the radio access technology based on the user equipment being determined to be at an indoor location; and
based on the probability, transmitting, to the user equipment, a second message comprising data representative of the measurement gap information.

16. The non-transitory machine-readable medium of claim 15, wherein the radio access technology is an implementation of a narrow band long term evolution communication protocol.

17. The non-transitory machine-readable medium of claim 15, wherein the radio access technology is an implementation of a long term evolution communication protocol.

18. The non-transitory machine-readable medium of claim 15, wherein the location of user equipment is inside a habitable structure.

19. The non-transitory machine-readable medium of claim 15, wherein the location based service is operational on a position determination entity equipment that is communicatively coupled to the serving cell equipment.

20. The non-transitory machine-readable medium of claim 15, wherein the operations further comprise determining a frequency band available at the location of the user equipment.

* * * * *